(12) United States Patent
Weissmueller

(10) Patent No.: US 6,715,819 B2
(45) Date of Patent: Apr. 6, 2004

(54) CONVERTIBLE VEHICLE WITH A STORABLE ROOF

(75) Inventor: Olaf Weissmueller, Bramsche (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/925,015

(22) Filed: Aug. 8, 2001

(65) Prior Publication Data

US 2002/0109372 A1 Aug. 15, 2002

(30) Foreign Application Priority Data

Aug. 8, 2000 (DE) .......................... 100 38 530

(51) Int. Cl.$^7$ .............................. B62D 25/12; B60J 7/20
(52) U.S. Cl. ...................... 296/107.08; 49/193; 296/76; 296/136.05
(58) Field of Search .............................. 296/76, 107.08, 296/136, 136.05; 49/193

(56) References Cited

U.S. PATENT DOCUMENTS

| | | | | |
|---|---|---|---|---|
| 1,933,623 A | * | 11/1933 | Gordon | |
| 2,552,898 A | * | 5/1951 | Lenci et al. | |
| 5,823,606 A | * | 10/1998 | Schenk et al. | |
| 5,944,378 A | * | 8/1999 | Mather et al. | |
| 6,030,023 A | * | 2/2000 | Guillez | |
| 6,062,628 A | * | 5/2000 | Guillez | |
| 6,092,335 A | * | 7/2000 | Queveau et al. | |
| 6,464,282 B2 | * | 10/2002 | Ellermann et al. | 296/70 |
| 2003/0218354 A1 | * | 11/2003 | Plesternings | 296/107.08 |

* cited by examiner

*Primary Examiner*—D. Glenn Dayoan
*Assistant Examiner*—Paul Chenevert
(74) *Attorney, Agent, or Firm*—Jordan and Hamburg LLP

(57) ABSTRACT

A convertible automobile has a roof which can be deposited in a rear area of the vehicle under a trunk lid. To uncover an opening for the roof, the trunk lid is mounted on a lock member permitting movement in a first opening direction about a body-fast axis of rotation at a rear end such that it forms an acute angle ($\alpha$) with a vector of travel when in the open position. In order to free a loading opening to the trunk space, the lock member permits movement of the trunk lid 4 in a second opening direction such that the trunk lid forms in the open position an obtuse angle ($\beta$) with the vector of travel. A part bearing an axis of rotation is configured such that the lock member associated with the trunk lid is situated, when the trunk lid is in the closed position, ahead of the axis of rotation in the direction of travel and, upon the movement of the trunk lid in the first opening direction, the lock member is carried on a circular path around the central axis of rotation.

19 Claims, 13 Drawing Sheets

CONVERTIBLE VEHICLE WITH A STORABLE ROOF

The invention relates to a convertible vehicle with a roof that is retractable under a trunk lid in a rear area of the vehicle wherein, to provide an opening for stowing the roof, the trunk lid can be moved in a first opening direction to a first open state and, to clear an opening for loading the trunk space, the trunk lid can be moved in a second opening direction to a second open state permitting loading of the trunk.

DE 198 51 181 C1 shows a trunk lid for a convertible car wherein a trunk lid has a lock member permit opening an entrance for stowage of a roof and which can turn about a catch affixed to a car body about an axis of rotation of the catch. A large gap is therefore needed toward the rear, below the axis of rotation. A gap of this kind is unsightly. To keep this gap from being too big, the axis of rotation is first raised up substantially vertically before rotation about it is permitted. This calls for considerable mechanical complexity. Furthermore, in the position wherein the opening for the entrance of the roof is uncovered, there is not sufficient support against torque about a longitudinal axis of the car, which is created by the weight distribution of the trunk lid, so that to accommodate it two pairs of lock members and catches have to be provided, which increases the weight and production cost.

SUMMARY OF THE INVENTION

It is an object of the invention to simplify a rear-end arrangement of a trunk lid on a convertible wherein, to provide an opening for stowing a roof, a trunk lid can be moved in a first opening direction to a first open state and, to clear an opening for loading a trunk space, the trunk lid can be moved in a second opening direction to a second open state permitting loading of the trunk space.

Briefly stated, the present invention provides a convertible automobile with a roof, which can be retracted into a rear area of the vehicle under a trunk lid, wherein on the one hand, to release an opening for stowing the roof, the trunk lid can be moved in a first opening direction with a lock member associated with it, such that in the open state it includes an acute angle with the vector of travel, and on the other hand to clear an opening for loading the trunk space it can be moved in a second opening direction such that the trunk lid includes an obtuse angle, while the lock member associated with the trunk lid is separated from a part bearing the pivot axis and is situated ahead of the pivot axis in a direction of travel when the trunk lid is in the closed position, and upon movement of the trunk lid in the first opening direction it is guided on a circular path about the central pivot axis.

By shifting the lock member longitudinally away from the axis of rotation in accordance with the invention, the raising up of the lock member takes place simultaneously with its rotation, since it is guided on a circular path. A separately controlled or driven vertical lifting of the lock member and/or the axis of rotation is therefore unnecessary, thus reducing the weight and the production cost.

With an especially advantageous arrangement of a plurality of connecting means alongside one another between the lock member and a counter-member associated with the car body, the result is a very stable support of the trunk lid against torque even when it is open.

If the connecting means include conically shaped engaging means, then, during the closing of the trunk lid, centering on the trunk loading opening simultaneously also takes place while the trunk lid is being closed from the open position.

Additional advantages and features will be found in an embodiment of the invention shown in the drawing and described below.

DESCRIPTION OF THE PREFERRED EMBODIMENTS

Figure 1:
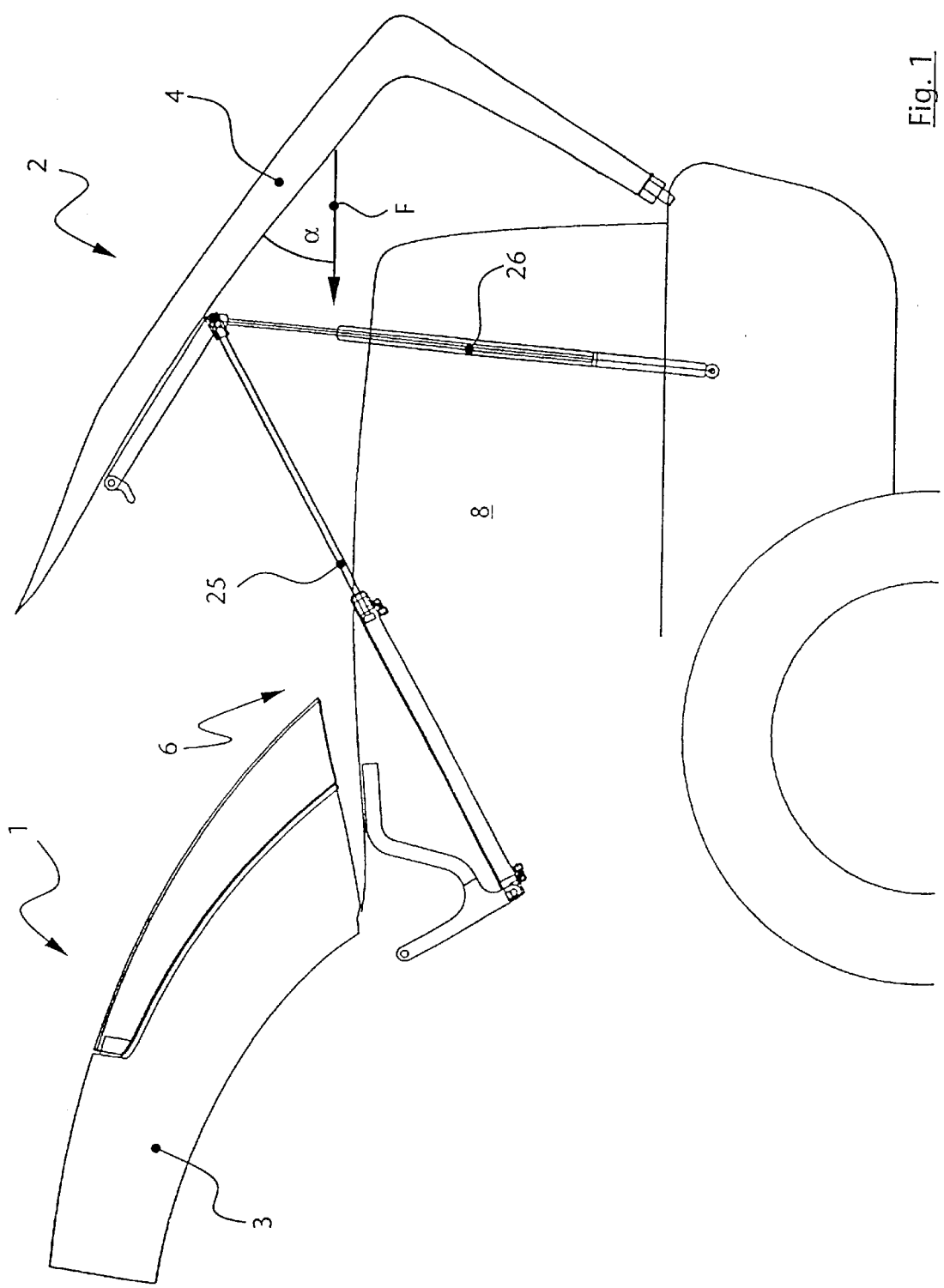
FIG. 1 shows a diagrammatic view of a convertible automobile according to the present invention with a trunk lid open to provide for entrance of a roof.

Referring to FIG. 1, a convertible automobile 1 has, in a rear area 2 of the vehicle, a retractable roof 3 which is to be contained in a retracted (opened) position underneath a trunk lid 4.

Figure 2:
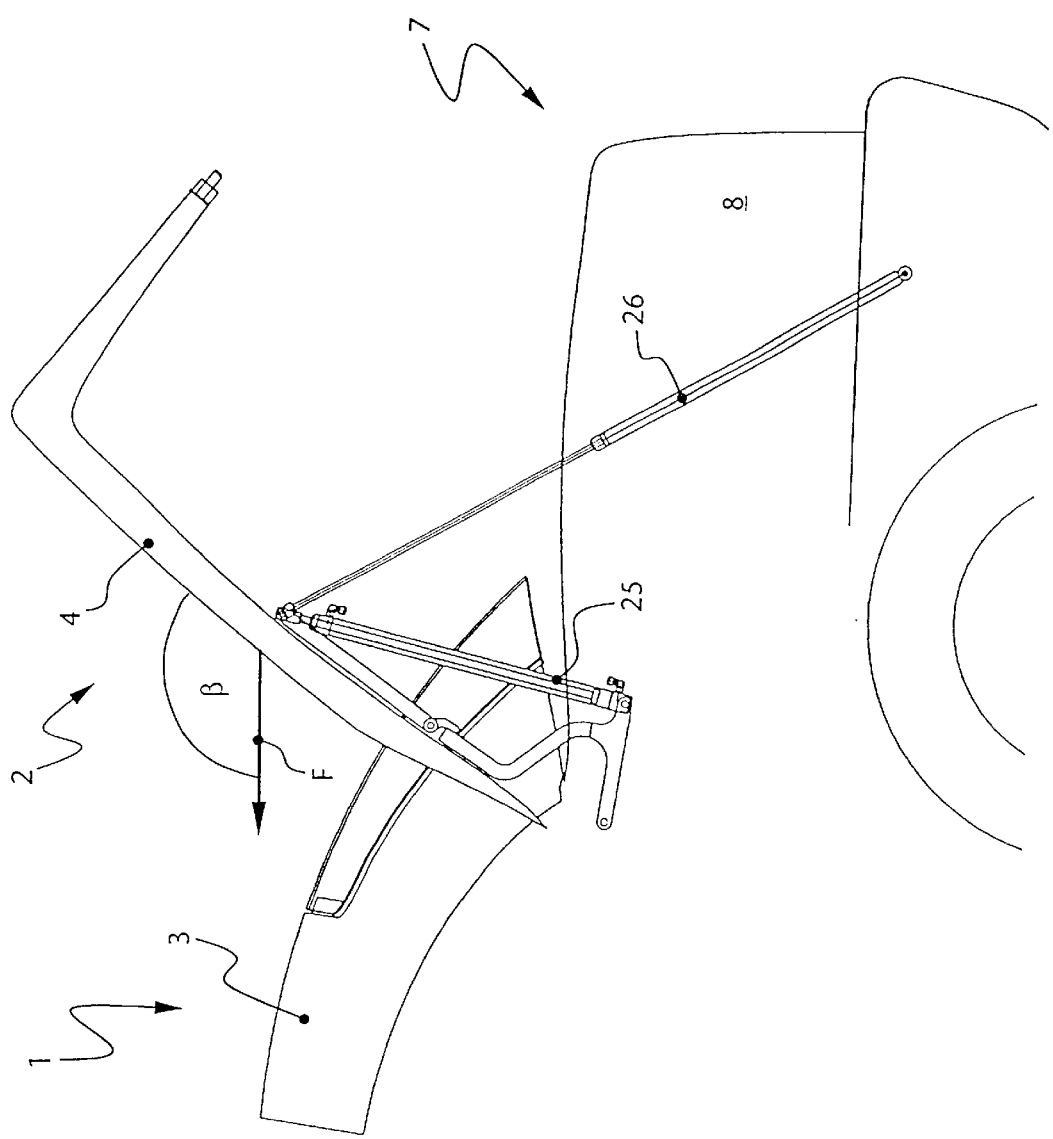
FIG. 2 shows a diagrammatic view of the convertible automobile of FIG. 1 with the trunk lid open to allow a trunk to be loaded.
Figure 4:
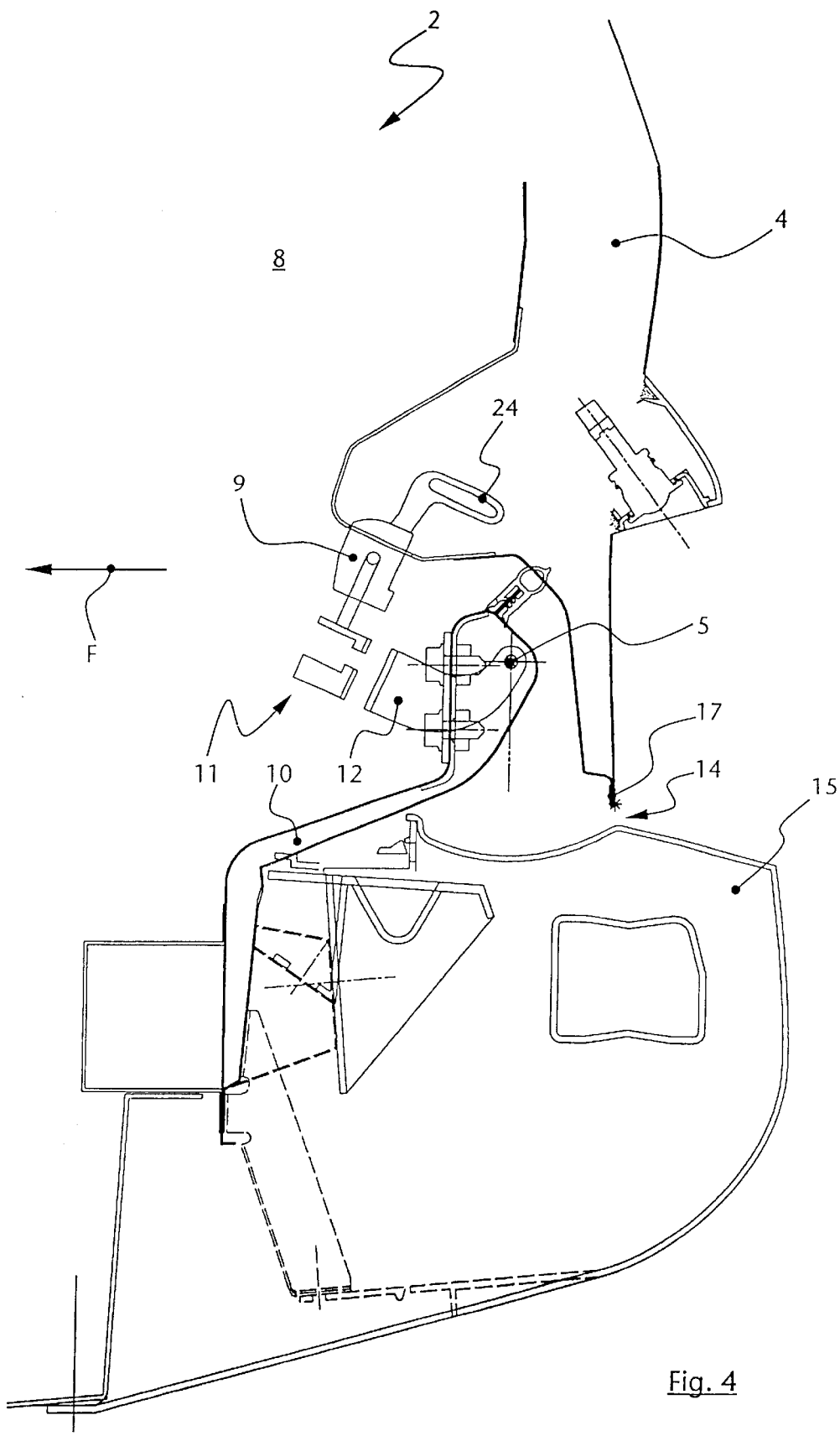
FIG. 4 shows detail IV in FIG. 3.
Figure 5:
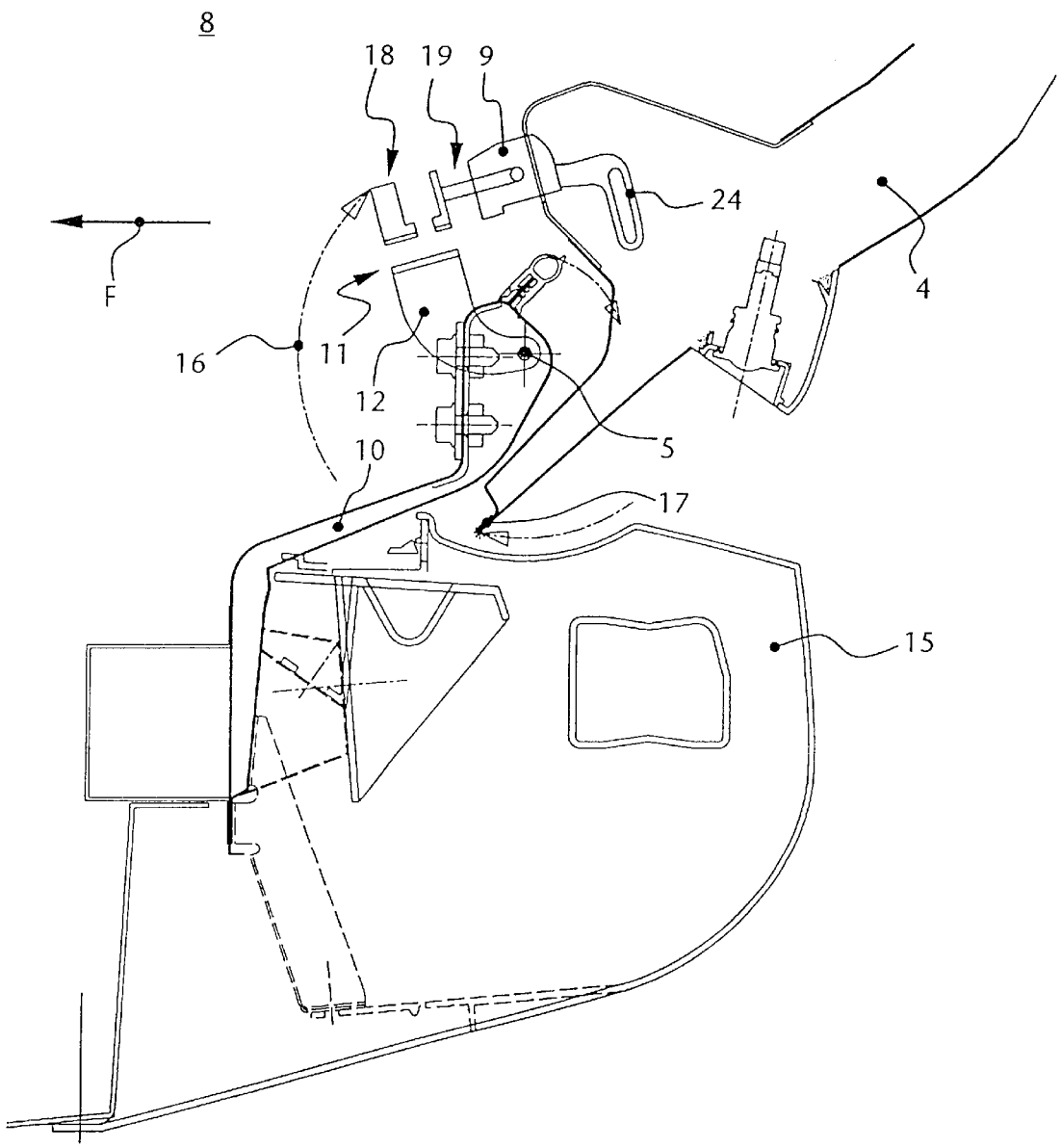
FIG. 5 shows a view similar to FIG. 4 with the lid open to accommodate the roof.
Figure 6:
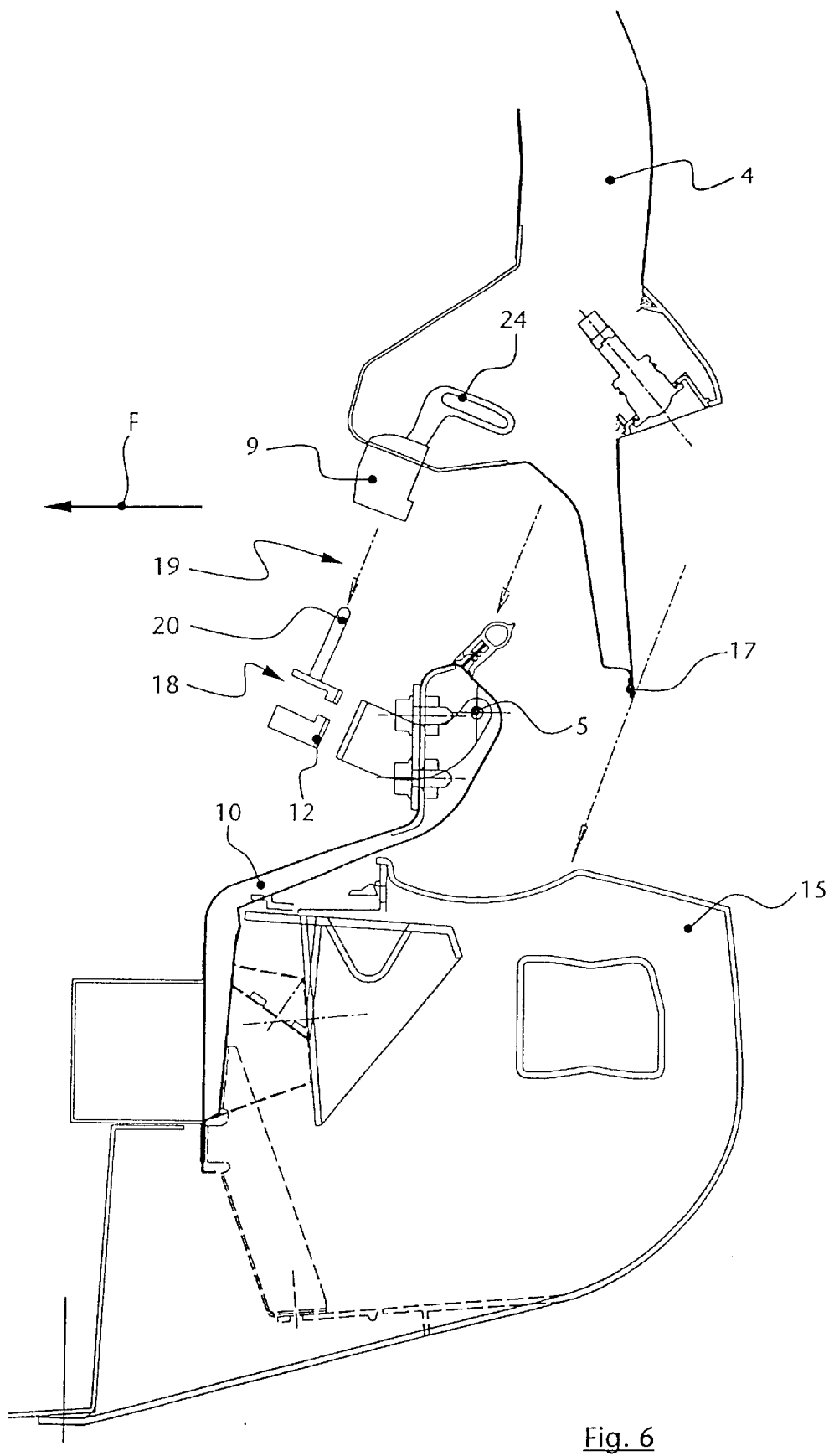
FIG. 6 shows a view similar to FIG. 4 with the lid open to allow the trunk to be loaded.
Figure 7:
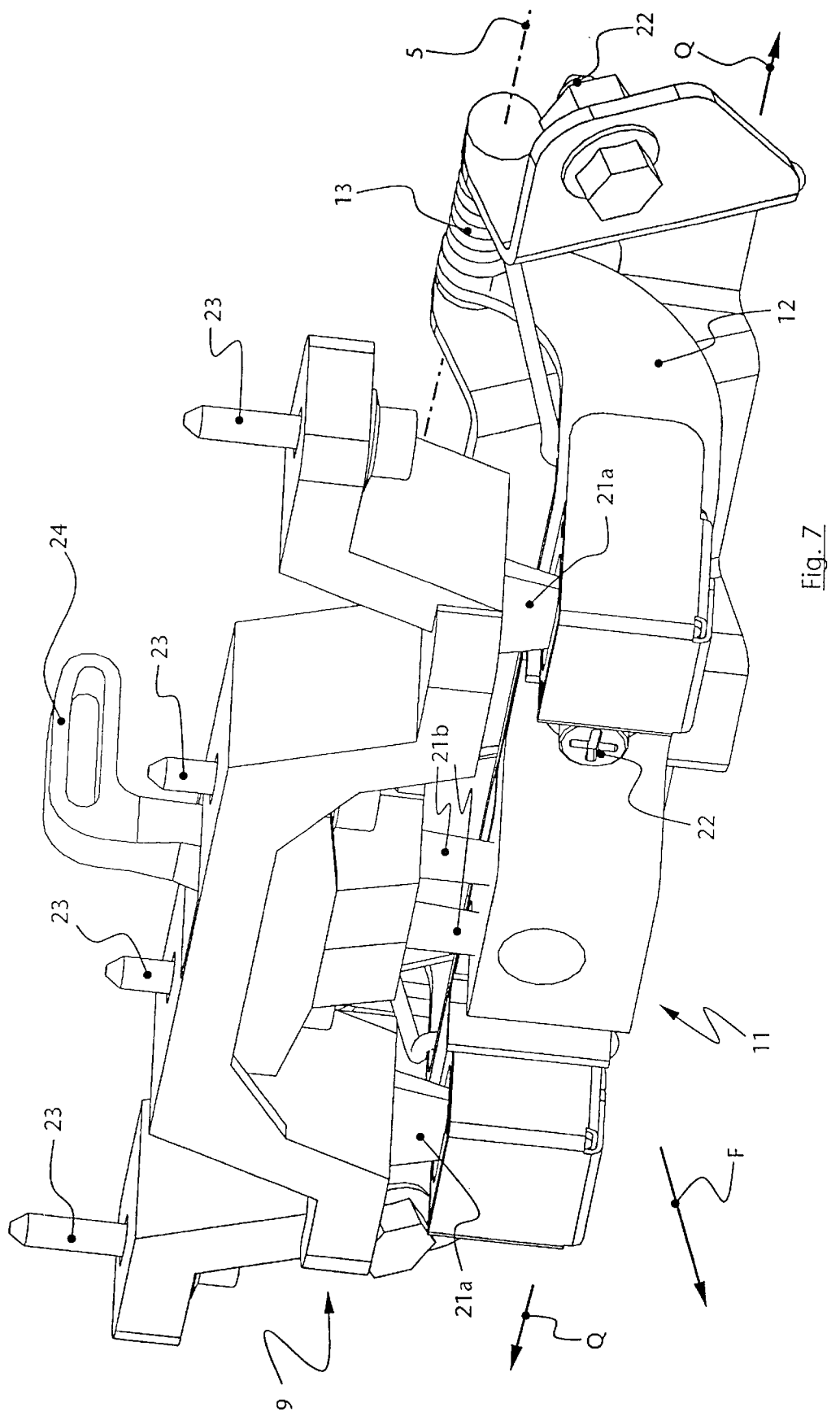
FIG. 7 shows a perspective view of a component bearing a cantilever arm as well as a lock member associated with the trunk lid.
Figure 8:
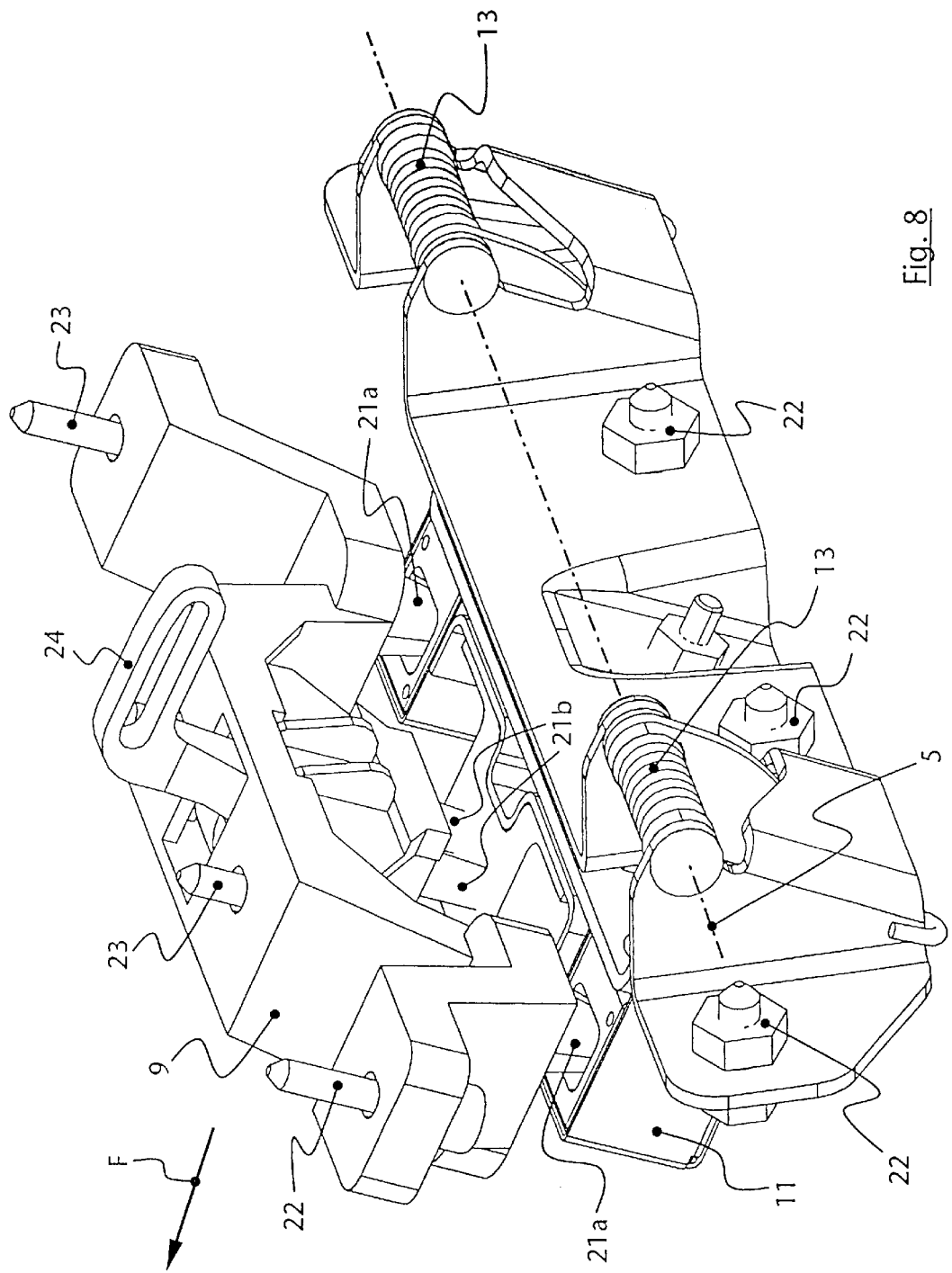
FIG. 8 shows an opposite perspective view of the parts in FIG. 7.
Figure 9:
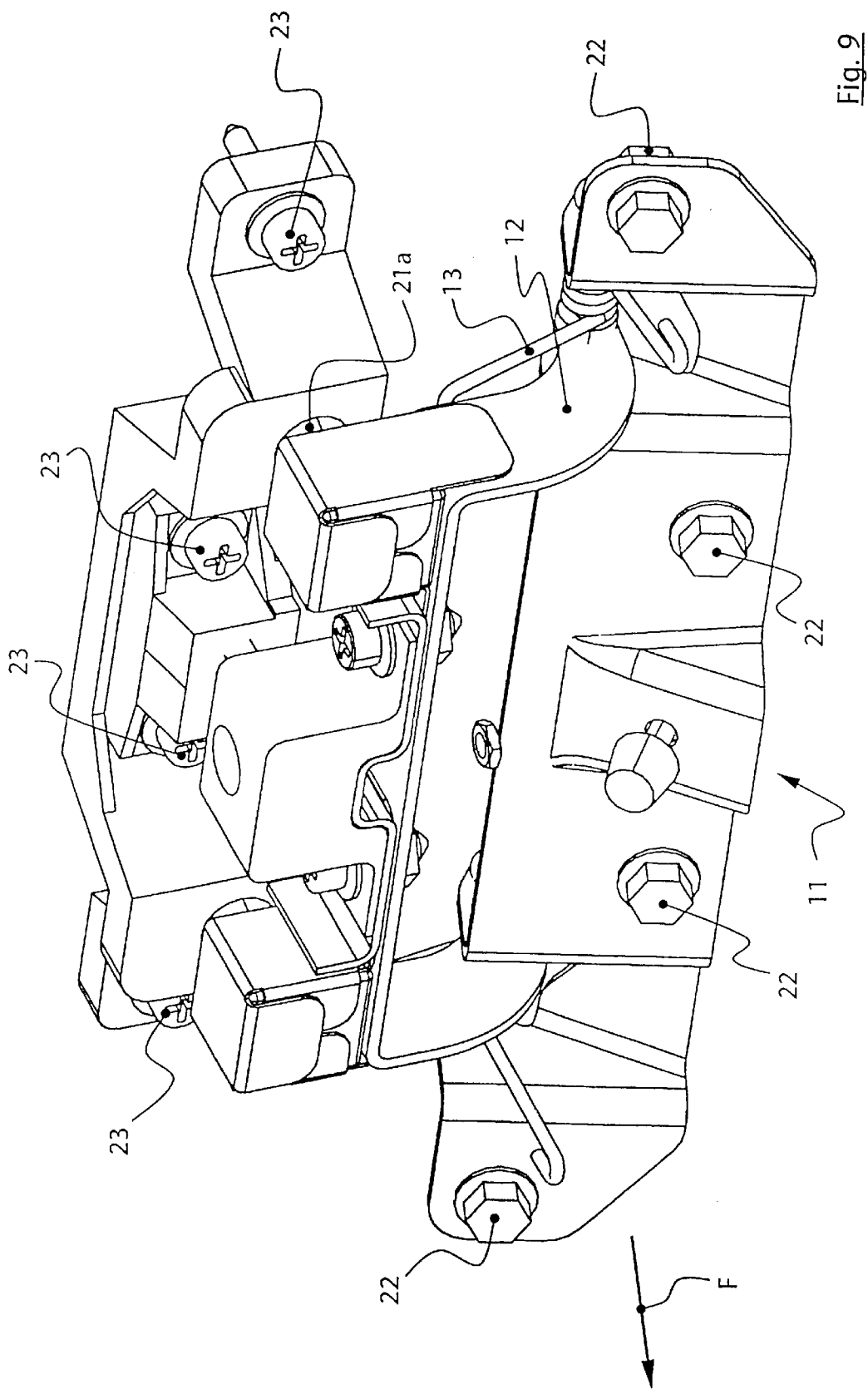
FIG. 9 shows a view of the parts in FIG. 7 as seen from below at an angle with the entrance open to receive the roof.

The trunk lid 4 can, on the one hand, move in an opening direction around a body-fast rearend axis of rotation 5, as shown in FIGS. 4–6, such that, when in the open state, it forms an acute angle a with a vector of travel F and thus opens an entrance 6 for the roof 3. On the other hand, the trunk lid 4 can be moved in a second opening sense, as shown in FIG. 2, such that, in the open position, it forms an obtuse angle p with the vector of travel F and thus provides an entrance 7 to a trunk space 8.

Figure 3:
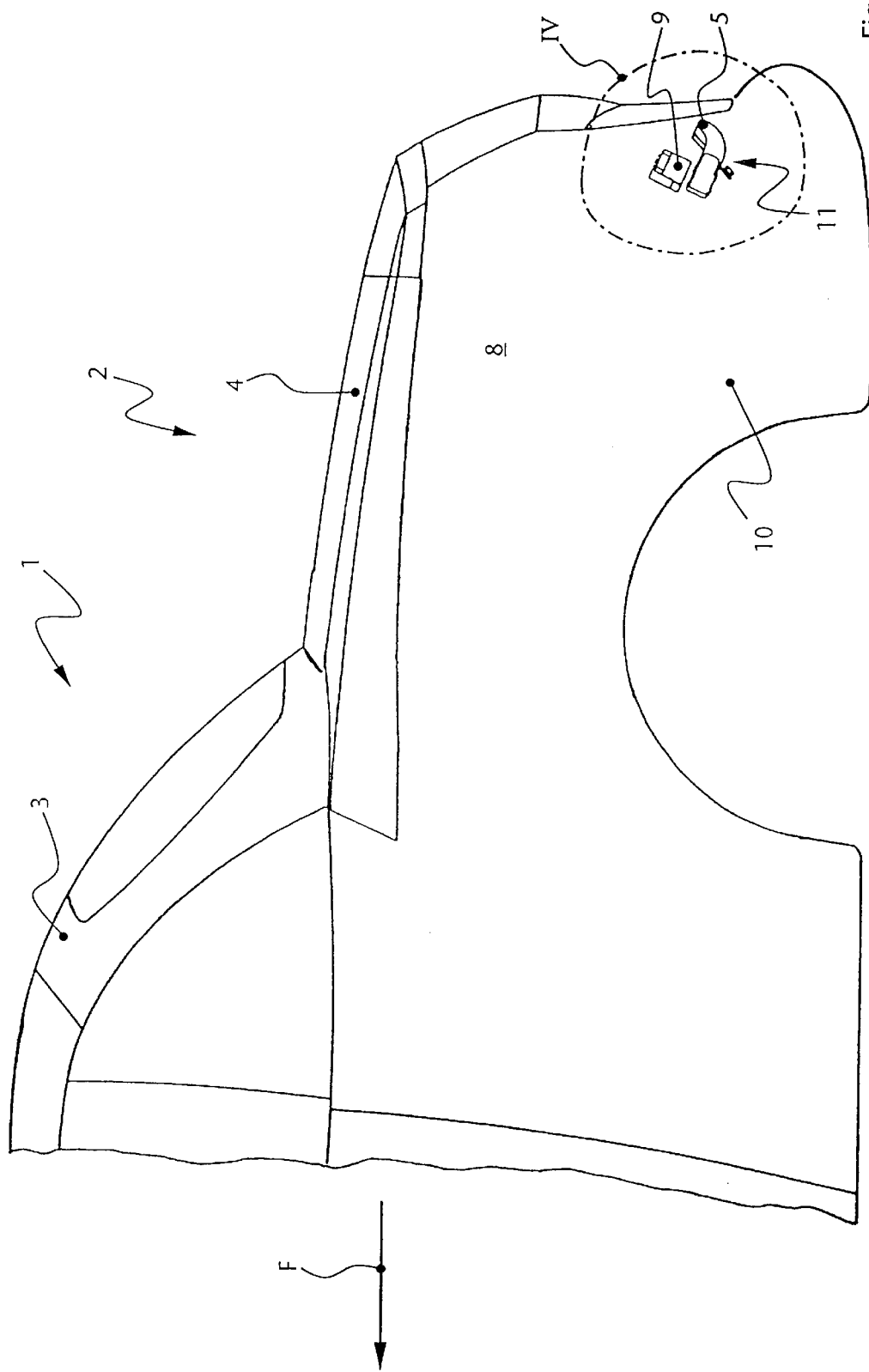
FIG. 3 shows the convertible car of FIG. 1 with the trunk lid closed and with diagrammatically indicated connecting parts between a car body and the trunk lid.

Referring to FIG. 3, the trunk lid 4 has at its back end a lock member 9, by means of which a connection is made to a component 11 connected to a body 10 to hold the trunk lid 4 in the closed position or in the open position in the first opening direction in order to provide an entrance 6 for the roof 2 as shown in FIG. 1. The lock member 9 is placed ahead, in the vector of travel F, of an axis of rotation 5, which extends in a direction Q across the vehicle and about which the trunk lid 4 can turn to free the opening 6.

Referring to FIGS. 4–6, the component 11 has an arm 12 reaching from the axis 5 substantially in the vector of travel F; an additional curvature or downwardly directed component can be provided on the arm 12. The arm 12 can turn about the axis 5 thereby permitting the entrance 6 to open for the roof 2 when the component 11 is connected to the lock member 9. As shown in FIGS. 8–13, the arm 12 is biased by springs 13 against the car body 10 so that hydraulic jacks 25 and gas jacks 26 shown in FIG. 1, or other drive means, act with spring support or upon contrary movement against the force of the spring 13.

Referring to FIGS. 4 and 5, due to an arrangement of the lock member 9, which a connection can be produced between the body 10 and the trunk lid 4 ahead, in direction F, of the axis 5, a gap 14, shown in FIG. 4, between the trunk lid 4 and parts connected to the body 10, especially a bumper 15, can be minimized. The lock member 9 is swung up on a circular path 16 while a rear bottom end 17 of the trunk lid 4 swings inward also on a circular path.

Referring to FIG. 6, an area 18 of the arm 12, remote from the axis of rotation 5, can be attached by fastening means 19 to the lock member 9 on the trunk lid, and can be detached in order to provide the opening 7 for loading the trunk space 8. In a first embodiment, the fastening means 19 include engaging means 20, which are fastened to area 18 of the arm 12, which engages and disengages the lock member 9, which can have an internal receiving pocket, permitting lifting of the trunk lid 4 to clear the opening 7 to the trunk space 8.

Referring to FIGS. 7–13, a preferred embodiment has engaging means 21a, 21b, 121a, associated with the lock member 9, so that, when the trunk loading opening 7 is accessible, the engaging means will not protrude into the user's area of action. The engaging means 21a, 21b and 121a lie side by side in direction Q across the vehicle. This assures support against torques created by the trunk lid 4 around a longitudinal axis of the vehicle and about the transverse axis of the vehicle. This is especially important whenever the trunk lid 4 swings upward to create the opening 6 for the roof 2. Any lateral tipping of the trunk lid can thus be prevented by resisting the torque. Likewise, any tipping of the trunk lid 4 about the transverse axis of the vehicle in relation to the lock member 9 is prevented, which is especially important for the precise execution of the movement.

In a first embodiment (FIG. 4) the external engaging means 21a are in the form of trapezoidal prongs whose length in the transverse direction Q is greater than in the direction of travel F, so that stability against torque is further improved. The tapering of the engaging means 21a and 21b also permits reliable centering when the entrance 7 to the trunk space 8 (FIG. 6) is closed.

The component 11 is affixed by fastening means 2 to he body 10, and the lock member 9 is affixed by fastening means 23 to the trunk lid 4 as shown in FIGS. 7–13.

Figure 10:
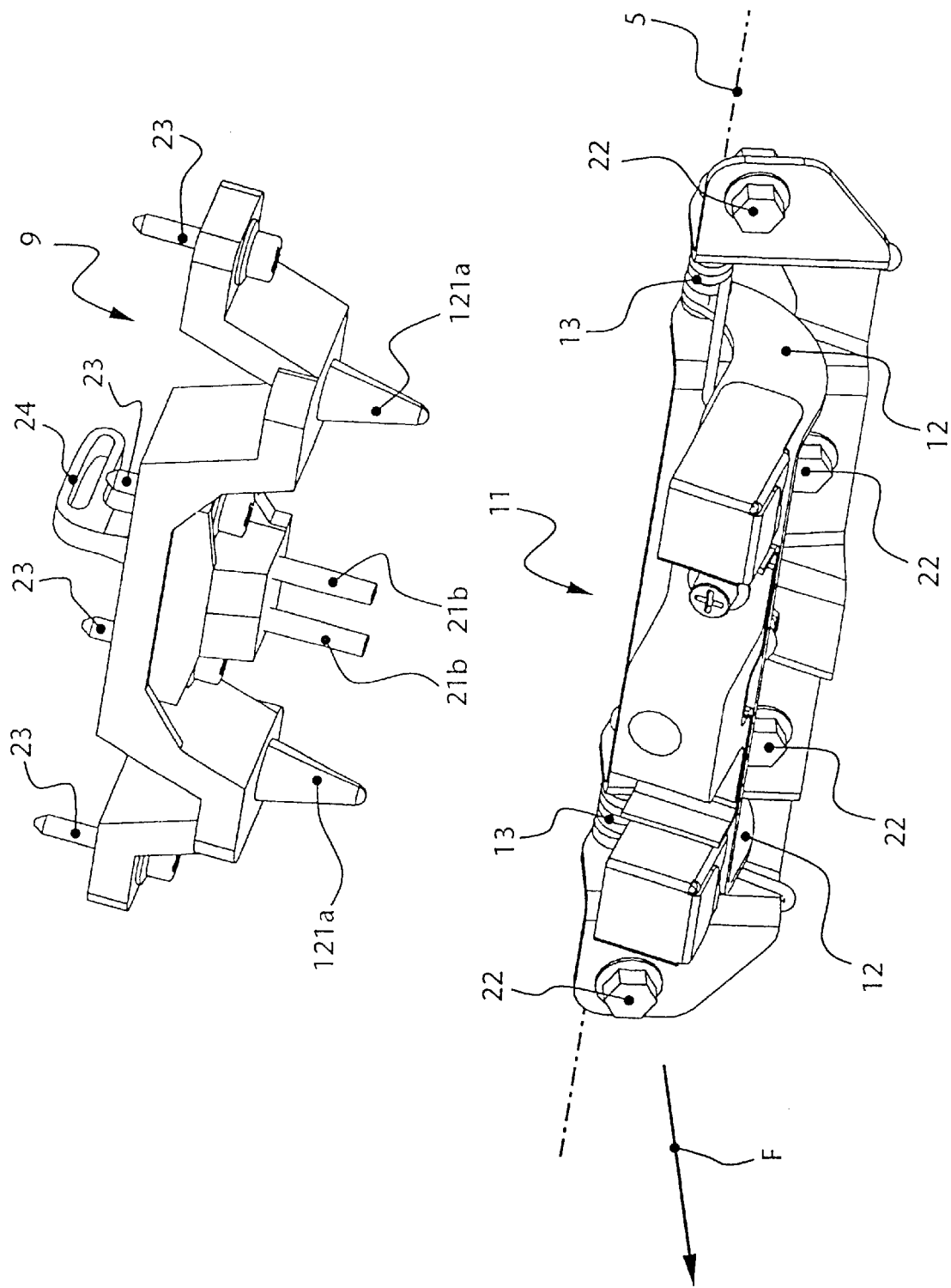
FIG. 10 shows a view similar to FIG. 7 with the trunk open for loading.
Figure 11:
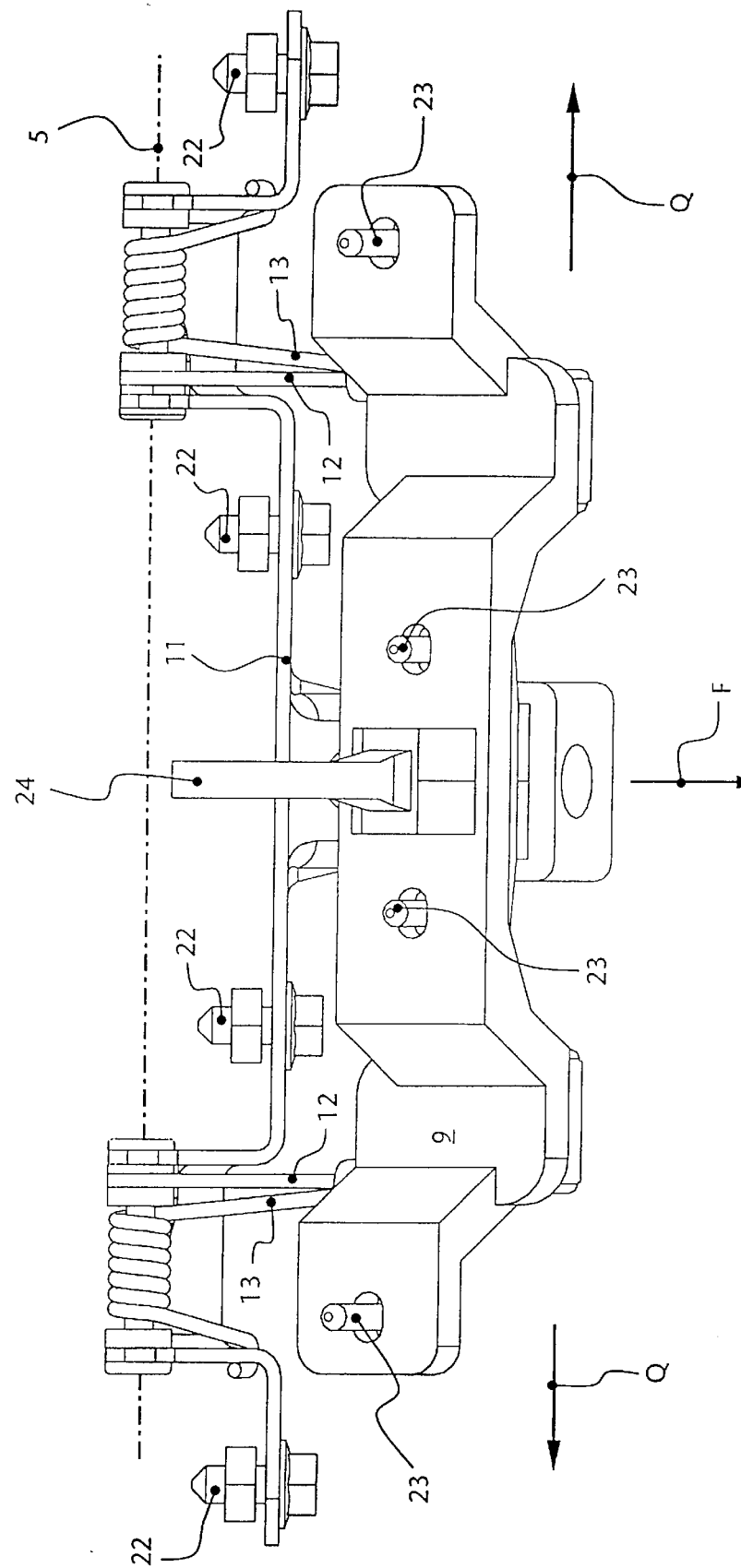
FIG. 11 shows the parts in FIG. 7 as seen from above.
Figure 12:
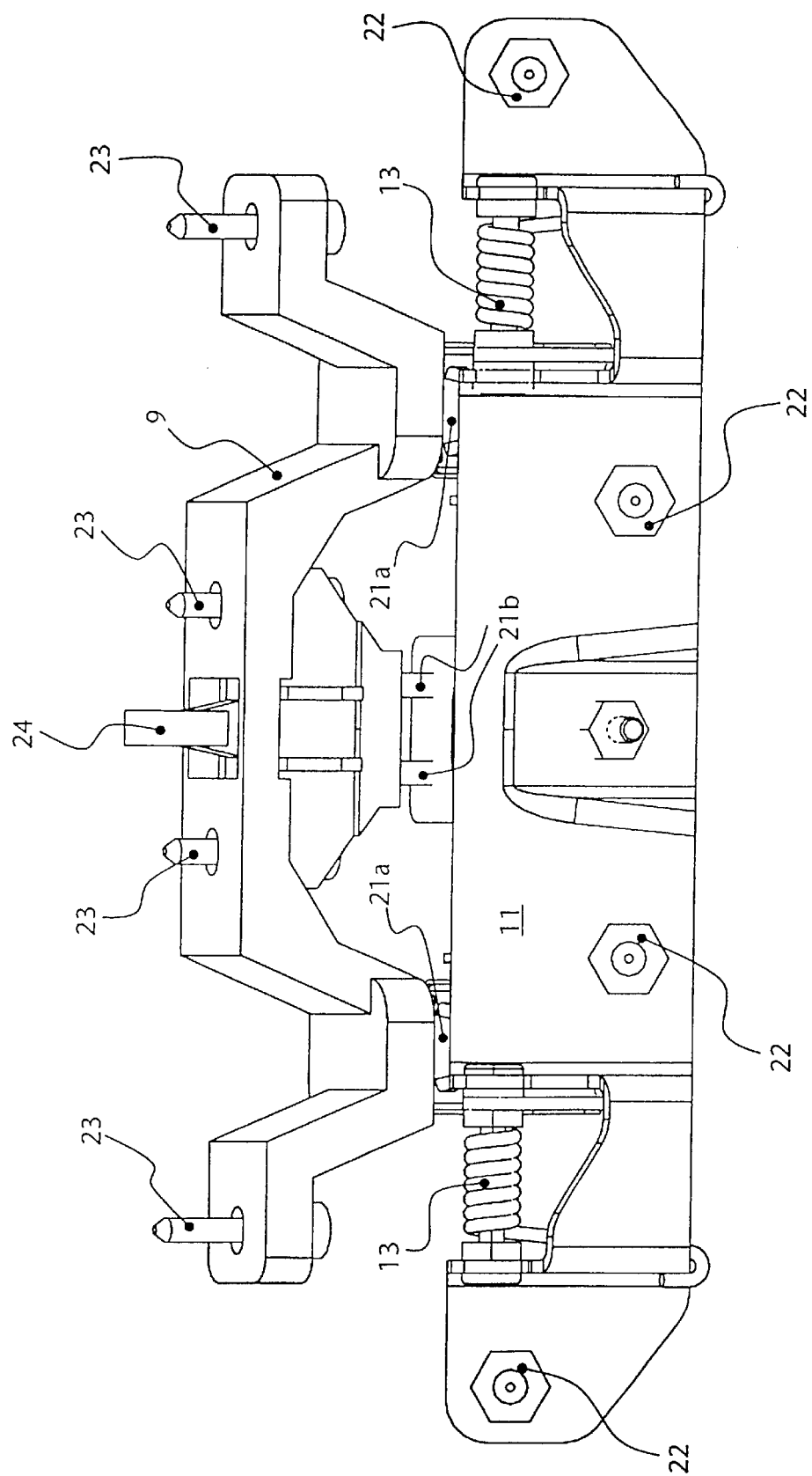
FIG. 12 shows the parts in FIG. 7 as seen from behind.
Figure 13:
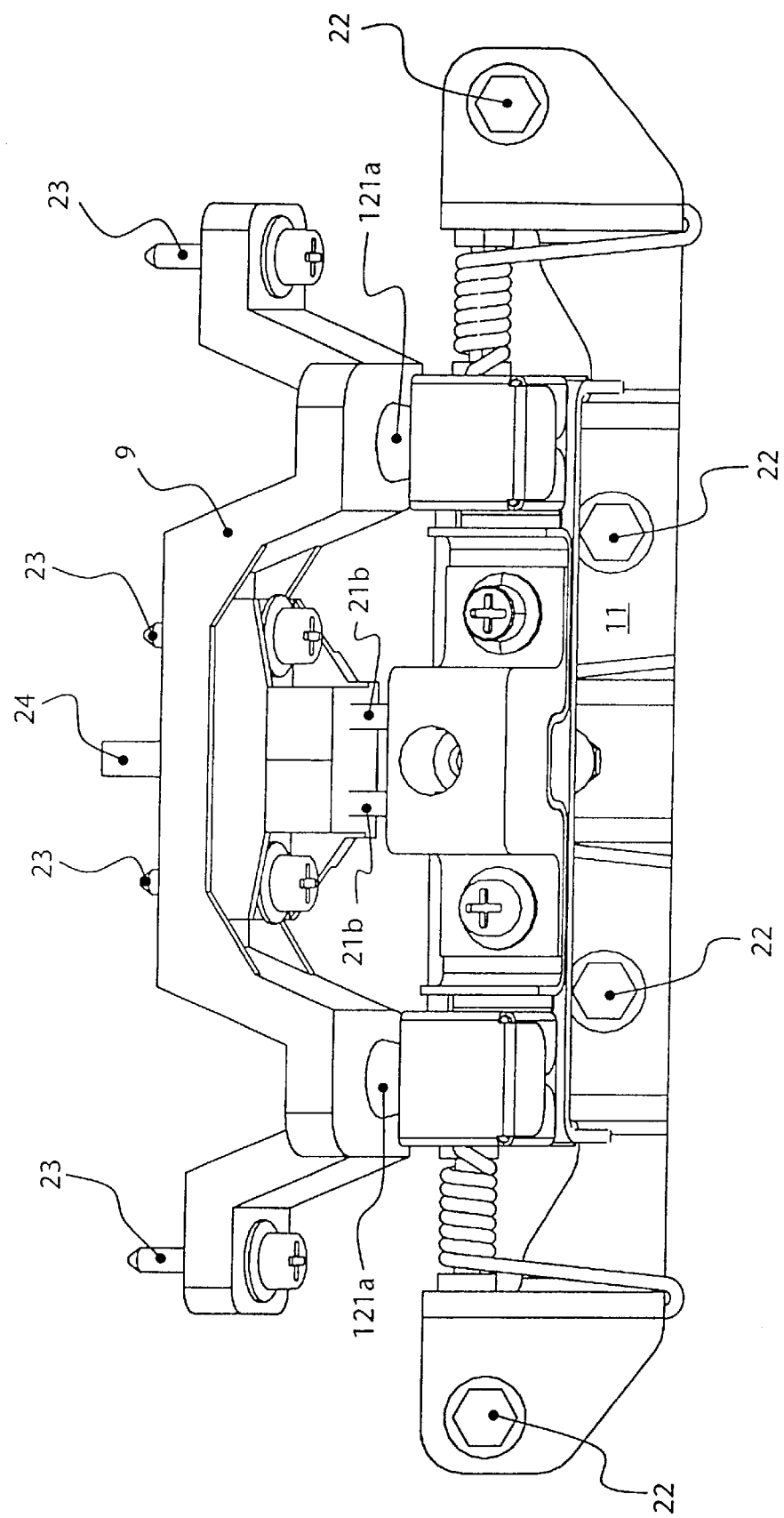
FIG. 13 shows the parts in FIG. 7 as seen from m front.

FIG. 10 shows an additional embodiment of the lock member 9, in which the outer engaging means 121a are cone The centering-pin operation is thus equally possible in the transverse direction Q and in the lengthwise direction F of the vehicle. The torque resistance is also assured with regard to the longitudinal and the transverse axis of the vehicle.

To disengage the engaging means 21a, 21b, 121a and 20 an operating means 24 is provided in the trunk cover 4, which can be operated by an external actuator or by a remote control, thereby separating the engaging means 19 on the trunk lid 4 and the car body 10.

The length of the system of engaging means 19 in the transverse direction Q of the vehicle is advantageously more than 15 cm, in order thus to be able to efficiently withstand the torque.

The lock member 9 and the component 11 can be made entirely of a metallic material, as for example cast aluminum or other common stable materials; the trunk lid 4 can be made of a metallic material, advantageously from a foam material, or from plastic.

What is claimed is:

1. A convertible vehicle comprising:

a body defining a trunk space;

a roof storable in said trunk space;

a trunk lid for closing said trunk space when in a closed position;

a mounting mechanism mounting said trunk lid for movement from said closed position in a first direction to a first position providing a first access opening to said trunk space for receiving said roof for storage in said trunk space, and for mounting said trunk lid for movement from said closed position in a second direction to a second position providing a second access opening to said trunk space for receiving items in said trunk space;

said mounting mechanism including an engagement mechanism for disengageably pivotally mounting a rear end portion of said trunk lid to said body in response to an actuating element to permit movement in said first direction to said first position, said engagement mechanism including:

an arm having first and second ends, said first end being pivotally connected to said body to permit rotation of said arm about a pivot axis extending in a transverse direction of the vehicle, said second end being distal from said pivot axis and said arm having an arm width extending in said transverse direction;

an engagement device having first and second engagement components which disengageably engage one another, one of said first and second engagement components being disposed on said second end of said arm and another one of said first and second components being disposed on said trunk lid; and said first and second engagement components having a plurality of engagement structures for effecting engagement of said first and second engagement components, said engagement structures being disposed spaced apart in the transverse direction of said vehicle in order to maximize torque resistance in a direction perpendicular to said pivot axis of said arm.

2. The convertible vehicle according to claim 1 wherein said engagement structures are disposed spaced apart in said transverse direction substantially over said arm width.

3. The convertible vehicle according to claim 2 wherein said engagement structures are disposed spaced apart over a distance of greater than 15 cm in the transverse direction.

4. The convertible vehicle according to claim 3 wherein said second end of said arm is disposed forward of said pivot axis in a forward direction of travel of the vehicle when said trunk lid is in the closed position.

5. The convertible vehicle according to claim 1 wherein said engagement structures each include a protruding member and a pocket for receiving said protruding member.

6. The convertible vehicle according to claim 5 wherein said protruding members are formed as catches having a trapezoidal shape for effecting alignment of said first and second engagement components.

7. The convertible vehicle according to claim 6 wherein said second end of said arm is disposed forward of said pivot axis in a forward direction of travel of the vehicle when said trunk lid is in the closed position.

8. The convertible vehicle according to claim 5 wherein the protruding member of each of said engagement structures is mounted on the first engagement component, the pocket of each of said engagement structures is disposed in the second engagement component.

9. The convertible vehicle according to claim 8 wherein said first engagement component is mounted on said trunk lid.

10. The convertible vehicle according to claim 9 wherein said pockets of said second engagement component are disposed spaced apart in said transverse direction substantially over said arm width.

11. The convertible vehicle according to claim 10 wherein said pockets of said second engagement component are disposed spaced apart over a distance of greater than 15 cm in the transverse direction.

12. The convertible vehicle according to claim 11 wherein said protruding members are formed as catches having a trapezoidal shape for effecting alignment of said first and second engagement components.

13. The convertible vehicle according to claim 12 wherein said second end of said arm is disposed forward of said pivot axis in a forward direction of travel of the vehicle when said trunk lid is in the closed position.

14. The convertible vehicle according to claim 1 wherein said arm is biased toward said body.

15. The convertible vehicle according to claim 14 wherein said engagement structures are disposed spaced apart in said transverse direction substantially over said arm width.

16. The convertible vehicle according to claim 15 wherein said engagement structures are disposed spaced apart over a distance of greater than 15 cm in the transverse direction.

17. The convertible vehicle according to claim 14 wherein said engagement structures each include a protruding member and a pocket for receiving said protruding member.

18. The convertible vehicle according to claim 17 wherein said second end of said arm is disposed forward of said pivot axis in a forward direction of travel of the vehicle when said trunk lid is in the closed position.

19. The convertible vehicle according to claim 18 wherein said protruding members are formed as catches having a trapezoidal shape for effecting alignment of said first and second engagement components.

* * * * *